US008180537B2

(12) United States Patent
Murayama et al.

(10) Patent No.: US 8,180,537 B2
(45) Date of Patent: May 15, 2012

(54) ENGINE CONTROL APPARATUS

(75) Inventors: Masami Murayama, Yokohama (JP); Masahiro Iriyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1092 days.

(21) Appl. No.: 12/051,678

(22) Filed: Mar. 19, 2008

(65) Prior Publication Data

US 2008/0255739 A1    Oct. 16, 2008

(30) Foreign Application Priority Data

Apr. 16, 2007 (JP) ................................. 2007-106869
Feb. 28, 2008 (JP) ................................. 2008-047528

(51) Int. Cl.
*B60W 10/04* (2006.01)

(52) U.S. Cl. ............... 701/54; 701/51; 701/67; 701/68; 477/107; 477/109; 477/110

(58) Field of Classification Search ............ 701/51, 701/54, 67, 68; 477/107, 108, 109, 110
See application file for complete search history.

(56) References Cited

U.S. PATENT DOCUMENTS

| | | | |
|---|---|---|---|
| 5,583,766 A * | 12/1996 | Birchenough et al. | 701/51 |
| 6,629,589 B2 * | 10/2003 | Inoue | 192/3.62 |
| 7,048,671 B2 * | 5/2006 | Morisawa et al. | 477/109 |
| 7,121,978 B2 * | 10/2006 | Murakami et al. | 477/109 |
| 2005/0124460 A1 * | 6/2005 | Iriyama | 477/107 |

FOREIGN PATENT DOCUMENTS

JP         58-200052        11/1983

* cited by examiner

*Primary Examiner* — Thomas Black
*Assistant Examiner* — Peter D Nolan
(74) *Attorney, Agent, or Firm* — Global IP Counselors, LLP

(57) ABSTRACT

An engine control apparatus controls an engine rotational speed to a target rotational speed by using a detected input side transmission rotational speed of a manual transmission as the target rotational speed upon detecting a clutch pedal depression amount during shifting being equal to or larger than a first prescribed depression amount, which is equal to or larger than a depression amount corresponding to a clutch disconnect position. The engine rotational speed is controlled to the target rotational speed by using the smaller of a computed transmission rotational speed (based on vehicle speed and gear ratio using a shift position) and the detected input side transmission rotational speed, upon detecting the clutch pedal depression amount during shifting being smaller than the first prescribed depression amount and larger than a second prescribed depression amount, which is smaller than the depression amount corresponding to the clutch disconnect position.

4 Claims, 6 Drawing Sheets

ENGINE CONTROL APPARATUS

CROSS-REFERENCE TO RELATED APPLICATIONS

This application claims priority to Japanese Patent Application No. 2007-106869, filed on Apr. 16, 2007 and Japanese Patent Application No. 2008-47528, filed on Feb. 28, 2008. The entire disclosures of Japanese Patent Application No. 2007-106869 and Japanese Patent Application No. 2008-47528 are hereby incorporated herein by reference.

BACKGROUND OF THE INVENTION

1. Field of the Invention

The present invention generally relates to an engine control apparatus. More particularly, the present invention relates to an engine control apparatus for synchronizing a rotational speed of an engine to an input rotational speed of a transmission when a clutch is released and the transmission is shifted.

2. Background Information

In a vehicle equipped with a manual transmission, when a clutch of the vehicle is released in order to shift gears, the input rotational speed of the clutch changes depending on the rotational speed of the engine and the output rotational speed of the clutch, i.e., the input rotational speed of the transmission, changes depending on the vehicle speed and the gear position of the transmission. Consequently, a physical shock ("shift shock") will occur if the clutch is connected with differing input and output rotational speeds after the gear position of the transmission has been changed.

In order to reduce the shift shock, it is necessary to synchronize the rotational speed of the engine with the input rotational speed of the transmission. In Japanese Laid-open Patent Publication No. 58-200052, when the transmission is shifted, the shift shock is suppressed by executing a rotational speed synchronization control wherewith the rotational speed of the engine is controlled to a rotational speed corresponding to the gear position in which transmission will be set after shifting (post-shift gear position).

In order to reduce the shift shock, it is necessary to synchronize the rotational speed of the engine with the input rotational speed of the transmission. In Japanese Laid-Open Patent Publication No. 58-200052, when the transmission is shifted, the shift shock is suppressed by executing a rotational speed synchronization control wherewith the rotational speed of the engine is controlled to a rotational speed corresponding to the gear position of the transmission after shifting (post-shift gear position). The rotational speed synchronization control is continued until the clutch connects. A clutch pedal switch is provided on the clutch pedal to detect whether the clutch is connected or released.

The clutch pedal switch is a switch that turns "on" when the depression amount of the clutch pedal is larger than a prescribed depression amount. Normally, the prescribed depression amount is a depression amount that is larger than a depression amount corresponding to a disconnect position of the clutch in order to reliably detect if the clutch is released.

However, when the prescribed depression amount is set in this fashion, there is a region where the clutch pedal switch does not turn on even though the clutch is released. In this region, the clutch pedal is not fully depressed, but the clutch is in a released state and it is possible to shift gears. Consequently, it is possible for a driver to shift gears without the rotational speed synchronization control being executed because the clutch pedal switch is not on. In such a case, shift shock will occur.

In view of the above, it will be apparent to those skilled in the art from this disclosure that there exists a need for an improved engine control apparatus. This invention addresses this need in the art as well as other needs, which will become apparent to those skilled in the art from this disclosure.

SUMMARY OF THE INVENTION

The present invention was conceived in view of this technical problem of the existing technology. One object of the present invention is to suppress the occurrence of shift shock by executing a rotational speed synchronization control even when the clutch pedal is not fully depressed during gear shifting.

In view of the above, an engine control apparatus is provided for a vehicle equipped with a manual transmission. The engine control apparatus basically comprises an operation detecting component, a vehicle speed detecting component, an input side transmission rotational speed computing component, a transmission input side rotational speed detecting component, a clutch depression amount detecting component and a rotational speed synchronization control component. The operation detecting component is configured to detect a manual shift operation. The vehicle speed detecting component is configured to detect a vehicle speed. The input side transmission rotational speed computing component is configured to compute an input side transmission rotational speed that is determined based on a vehicle speed and a gear ratio based on a shift position detected by the shift operation detecting component. The transmission input side rotational speed detecting component is configured to detect an input rotational speed of the manual transmission. The clutch depression amount detecting component is configured to detect if a depression amount of the clutch pedal is larger than a first prescribed depression amount that is equal to or larger than a depression amount corresponding to a disconnect position of the clutch, and to detect if the depression amount of the clutch pedal is larger than a second prescribed depression amount that is smaller than the depression amount corresponding to the disconnect position of the clutch. The rotational speed synchronization control component is configured to control an engine rotational speed to a target rotational speed by using the input side transmission rotational speed computed by the transmission input side rotational speed computing component as the target rotational speed when the clutch depression amount detecting component has detected that the depression amount of the clutch pedal during shifting is equal to or larger than the first prescribed depression amount. The rotational speed synchronization control component is further configured to control the engine rotational speed to the target rotational speed by using the smaller of the input side transmission rotational speed that computed by the transmission input side rotational speed computing component and the input rotational speed detection value detected by the transmission input side rotational speed detecting component as the target rotational speed, when the clutch depression amount detecting component has detected that the depression amount of the clutch pedal during shifting is smaller than the first prescribed depression amount and larger than the second prescribed depression amount.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
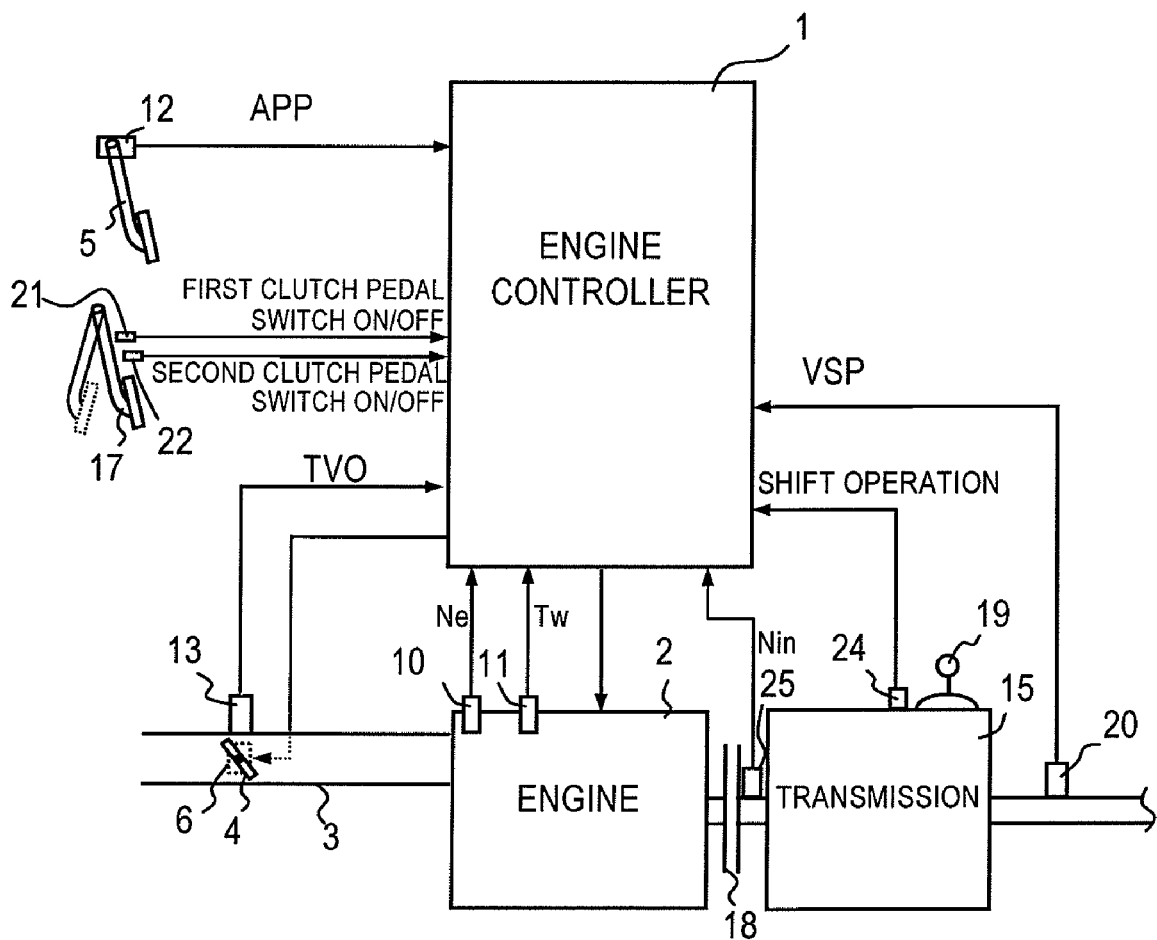
FIG. 1 is a simplified schematic view of a vehicle equipped with an engine control apparatus (engine controller) in accordance with the illustrated embodiment.

FIG. 1 is a simplified schematic view of a vehicle equipped with an engine control apparatus in accordance with the present invention. Basically, the vehicle is equipped with an engine controller 1 and an engine 2 with an intake passage 3 in which a throttle valve 4 is provided. The throttle valve 4 is an electronically controlled throttle valve contrived such that its opening degree can be controlled independently from the position of an accelerator pedal 5. A throttle actuator 6 is mounted to the throttle valve 4 for controlling the opening degree of the throttle valve 4.

The engine 2 is equipped with an engine speed sensor 10 and a coolant temperature sensor 11. The engine speed sensor 10 is configured and arranged to detect am engine rotational speed Ne of the engine 2. The coolant temperature sensor 11 is configured and arranged to detect a coolant temperature Tw of the engine 2. The accelerator pedal 5 is equipped with an accelerator pedal position sensor 12. The accelerator pedal position sensor 12 is configured and arranged to detect an accelerator pedal position APP indicating the accelerator operation amount. The throttle valve 4 is equipped with a throttle opening sensor 13. The throttle opening sensor 13 is configured and arranged to detect a throttle valve opening degree TVO.

The output rotation of the engine 2 undergoes a torque-speed conversion in a transmission 15 and is transferred to an output shaft of the transmission 15. From the transmission output shaft, the torque is transferred to drive wheels (not shown) of the vehicle. A clutch pedal 17 is installed between an output shaft of the engine 2 and an input shaft of the transmission 15. A clutch 18 is configured and arranged to be connected and released in response to operation of the clutch pedal 17. The transmission 15 is a manual transmission having discrete gear positions that can be changed by operating a shift lever 19 that is operatively connected to the transmission 15. The transmission 15 has, for example, six forward speeds and one reverse speed.

The engine controller 1 preferably includes a microcomputer with a an engine rotational speed synchronization control program that serves to match the rotational speed of the engine 2 of such a vehicle to an input rotational speed of the manual transmission 15 when a driver operates the clutch 18 so as to disconnect the clutch 18 in order to change the gear position of the transmission 15. In particular, the microcomputer of the engine controller 1 is programmed to control the intake air quantity and ignition timing of the engine 2 such that the engine rotational speed is matched to the input rotational speed of the transmission 15. The transmission input rotational speed, to which the engine rotational speed is adjusted, is determined based on the vehicle speed and the gear ratio that will result after the shift operation is completed (post-shift gear ratio). The engine controller 1 also includes other conventional components such as an input interface circuit, an output interface circuit, and storage devices such as a ROM (Read Only Memory) device and a RAM (Random Access Memory) device. The internal RAM of the engine controller 1 stores statuses of operational flags and various control data. The internal ROM of the engine controller 1 stores the control programs for various operations. It will be apparent to those skilled in the art from this disclosure that the precise structure and algorithms for the engine controller 1 can be any combination of hardware and software that will carry out the functions of the present invention. Basically, the engine controller 1 constitutes a main part (i.e., a rotational speed synchronization control component) of the engine control apparatus of the illustrated embodiment.

A vehicle speed sensor 20 is installed on the transmission 15. The vehicle speed sensor 20 is configured and arranged to detect a vehicle speed VSP based on the output rotational speed of the transmission 15. The vehicle speed sensor 20 constitutes one example of a vehicle speed detecting component for the illustrated embodiment. A first clutch pedal switch 21 is installed on the clutch pedal 17. The first clutch pedal switch 21 is configured and arranged to detect a clutch operation performed by a driver and turn "on" when the driver depresses the clutch pedal 17 to a position in which the clutch 18 releases (disconnects). A second clutch pedal switch 22 is also installed on the clutch pedal 17. The second clutch pedal switch 22 is configured and arranged to detect a clutch operation performed by a driver and turn "on" when the driver depresses the clutch pedal 17 to a position just prior to the clutch 18 being released (disconnected). Thus, the first and second clutch pedal switches 21 and 22 indicate a connection state (connected or disconnected) of the clutch 18. The clutch pedal switches 21 and 22 together constitute one example of a clutch depression amount detecting component for the illustrated embodiment.

A shift operation sensor 24 is installed on the shift lever 19. The shift operation sensor 24 is configured and arranged to detect an operation direction (shift direction) of the shift lever 19 and to detect a gear position of the transmission 15. The shift operation sensor 24 constitutes one example of a shift operation detecting component for the illustrated embodiment. The shift operation sensor 24 can also detect which shift position the driver is changing to by detecting the current shift position and the direction in which the driver is operating the shift lever 19. Also the shift operation sensor 24 constitutes one example of a gear position detecting component for the illustrated embodiment. Thus, the gear position that the transmission 15 will be in after the shift operation is performed can be detected at a different timing from the timing at which the gear position of the transmission 15 actually changes to the position corresponding to the post-shift position of the shift lever 19.

A transmission input rotational speed sensor 25 is installed on the input shaft side of the transmission 15. The transmission input rotational speed sensor 25 is configured and arranged to detect an input rotational speed of the transmission 15. The transmission input rotational speed sensor 25 constitutes a transmission input side rotational speed detecting component.

Figure 2:
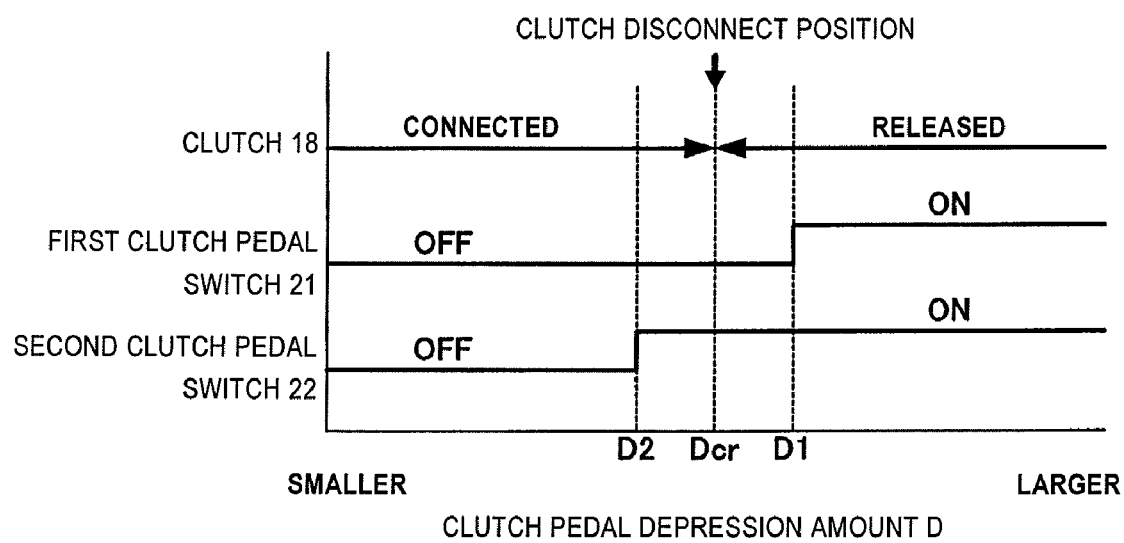
FIG. 2 is a plot showing the relationships of the output signals of a first clutch pedal switch and a second clutch pedal switch with respect to the connection state (connected or disconnected) of the clutch between the engine and the transmission.

FIG. 2 is a plot showing the relationships of the output signals of the first and second clutch pedal switches 21 and 22 with respect to the connection state (connected or disconnected) of the clutch 18. The "clutch disconnect position" is the depression amount of the clutch pedal 17 where the connection state of the clutch 18 changes from a connected state to a disconnected state. Although this embodiment uses clutch pedal switches, it is also acceptable to use a sensor that provides a linear output corresponding to the clutch depression amount.

The first clutch pedal switch 21 is configured and arranged to be "on" when the depression amount D of the clutch pedal 17 is larger than a first prescribed depression amount D1 and to be "off" when the depression amount D of the clutch pedal 17 is smaller than the first prescribed depression amount D1. The first prescribed depression amount D1 is equal to or larger than a depression amount Dcr corresponding to a clutch disconnect position in which the clutch 18 is fully disconnected. The first prescribed depression amount D1 is used to ensure that the release of the clutch 18 can be detected in a reliable fashion, and the release of the clutch 18 can be detected more reliably by setting the first prescribed depression amount D1 to a value that is slightly larger than the depression amount Dcr corresponding to the clutch disconnect position.

The second clutch pedal switch 22 is configured and arranged to be "on" when the depression amount D of the clutch pedal 17 is larger than a second prescribed depression amount D2 and to be "off" when the depression amount D of the clutch pedal 17 is smaller than the second prescribed depression amount D2. The second prescribed depression amount D2 is smaller than the depression amount Dcr corresponding to the clutch disconnect position. The second prescribed depression amount D2 is set to a value smaller than the depression amount Dcr corresponding to the clutch disconnect position in order to ensure that connection of the clutch 18 can be detected reliably based on the second clutch pedal switch 22 turning "off". The signal issued from the second clutch pedal 22 makes it possible to determine if there is possibility that the driver will shift gears without waiting to detect the signal of the first clutch switch 21.

The detection values of the sensors and switches are fed to the engine controller 1. Based on the received detection signals, the engine controller 1 executes fuel injection control and ignition timing control of the engine 2. The engine controller 1 is further configured and arranged to execute a rotational speed synchronization control whereby the engine rotational speed Ne of the engine 2 is controlled to a target rotational speed tNe corresponding to a gear position of the transmission 15. Thus, the rotational speed synchronization control is executed when the clutch pedal 17 is depressed during gear shifting. Preferably, the rotational speed synchronization control comprises a first rotational speed synchronization control and a second rotational speed synchronization control. The first rotational speed control is executed when the depression amount D of the clutch pedal 17 is large and the first clutch pedal switch 21 is "on". The second rotational speed synchronization control is executed when the depression amount D is insufficient to make the first clutch pedal switch 21 turn "on" (switch 21 is "off") but the large enough to make the second clutch pedal switch 22 turn "on".

With this embodiment, even when the clutch pedal 17 is not depressed fully during shifting, synchronization control of the rotational speeds of the engine 2 and the transmission 15 can be executed quickly and the occurrence of shift shock can be reliably suppressed. Additionally, since the second rotational speed synchronization control is configured to set the target rotational speed tNe to the smaller of a transmission rotational speed that is determined based on a vehicle speed and a gear ratio based on the shift position detected by the shift operation sensor 24 and a transmission input rotational speed detection value detected by the transmission input rotational speed sensor 25, acceleration or deceleration that is contrary to the intent of a driver does not occur.

Figure 3:
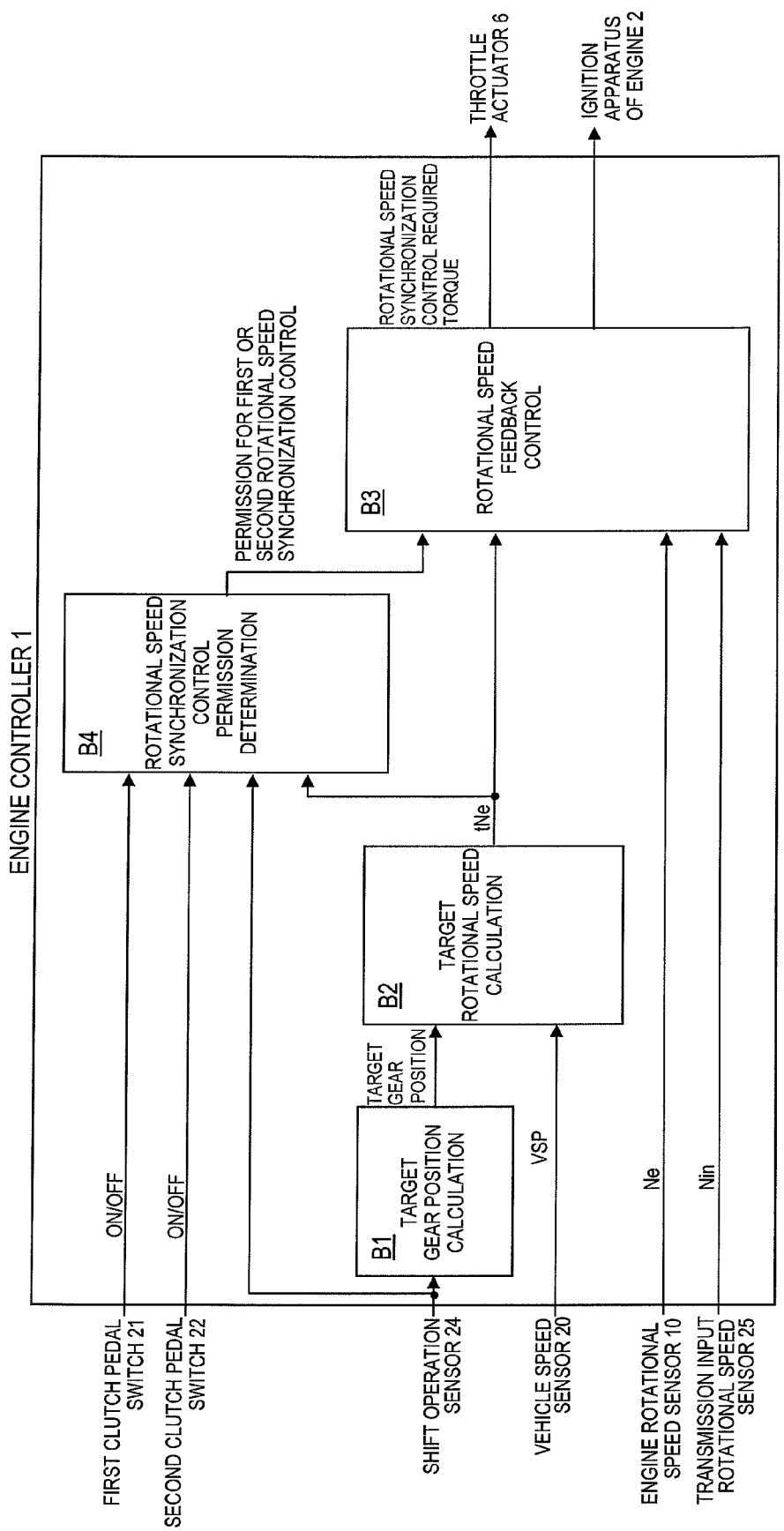
FIG. 3 is a control block diagram illustrating a portion of the engine controller that relates to a rotational speed synchronization control.

FIG. 3 is a control block diagram illustrating the portion of the engine controller 1 that relates to the rotational speed synchronization control.

The engine controller 1 is configured and arranged to calculate a next (target) gear position tGP of the transmission 15 based on a driver shift operation performed by the driver (see, block B1) and to calculate a predicted input rotational speed of the transmission 15 that will result when the transmission 15 has shifted from the current gear position to the target gear position tGP (see, block B2). The predicted or computed input rotational speed of the transmission 15 will hereinafter be called "transmission input rotational speed" Nin*. The calculation (prediction) of the transmission input rotational speed Nin* is based on the vehicle speed VSP and a gear (target) position having a gear ratio determined based on the detected shift position (transmission rotational speed computation).

When the first or second rotational speed synchronization control is started, the engine controller 1 executes a rotational speed feedback control that serves to control the throttle valve opening degree TVO and an ignition timing retardation amount such that the rotational speed Ne of the engine 2 becomes substantially equal to (matches) the target rotational speed tNe (block B3).

The method of setting the target rotational speed tNe differs depending on whether the first or the second rotational speed synchronization control is started. If the first rotational speed synchronization control is started, then the post-shift transmission input rotational speed Nin* is set as the target rotational speed tNe. If the second rotational speed synchronization control is started, then the smaller of the post-shift transmission input rotational speed Nin* and a detection value Nin of the transmission input rotational speed is set as the target rotational speed tNe.

The reason the target rotational speed tNe is set in the manner just described during the second rotational speed synchronization control will now be explained. When the first clutch pedal switch 21 is "off" and the second clutch pedal switch 22 is "on", there is a possibility that the clutch 18 is connected (see FIG. 2). If the clutch 18 is connected and the rotational speed synchronization control is executed with the post-shift transmission input rotational speed Nin* set as the target rotational speed tNe, then an acceleration or deceleration not intended by the driver will occur.

The first rotational speed synchronization control is started whenever the first clutch pedal switch 21 is "on". The second rotational speed synchronization control is started when the first clutch pedal switch 21 is "off" and the second clutch pedal switch 22 is "on" (block B4).

Figure 4:
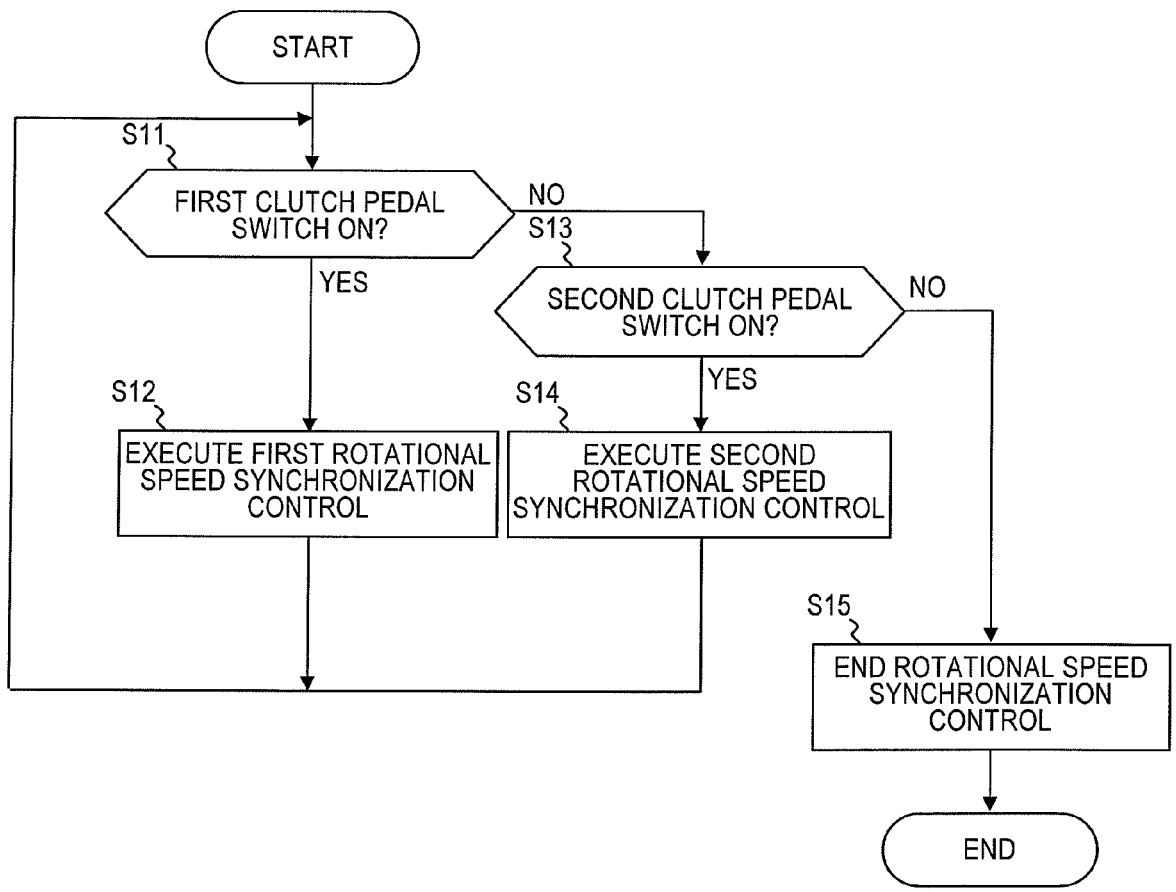
FIG. 4 is a flowchart illustrating the processing executed in order to conduct the rotational speed synchronization control executed by the engine controller.

FIG. 4 is a flowchart showing in detail the rotational speed synchronization control executed by the engine controller 1. The rotational speed synchronization control will now be explained more thoroughly with reference to the flowchart.

In step S11, the engine controller determines if the first clutch pedal switch 21 is "on". If the first clutch pedal switch 21 is "on", the engine controller 1 proceeds to step S12 and executes the first rotational speed synchronization control.

If the first clutch pedal switch 21 is "off", then the engine controller 1 proceeds to step S13 and determines of the second clutch pedal switch 22 is "on". If the second clutch pedal switch 22 is "on", the engine controller 1 proceeds to step S14 and executes the second rotational speed synchronization control.

If both the first and the second clutch pedal switches 21 and 22 are "off", then the engine controller 1 proceeds to step S15 and ends the first and second rotational speed synchronization controls. Since the clutch 18 is already connected when the second clutch pedal switch 22 is "off", ending the rotational speed synchronization control when both switches 21 and 22 are "off" can prevent shift shock from occurring due to the rotational speed synchronization control ending before the clutch 18 is connected. The condition for ending the first and second rotational speed synchronization controls is not limited to the condition just described. It is also acceptable to end whichever of the first and second rotational synchronization controls is being executed when the corresponding switch 21 or 22 turns "off".

Figure 5:
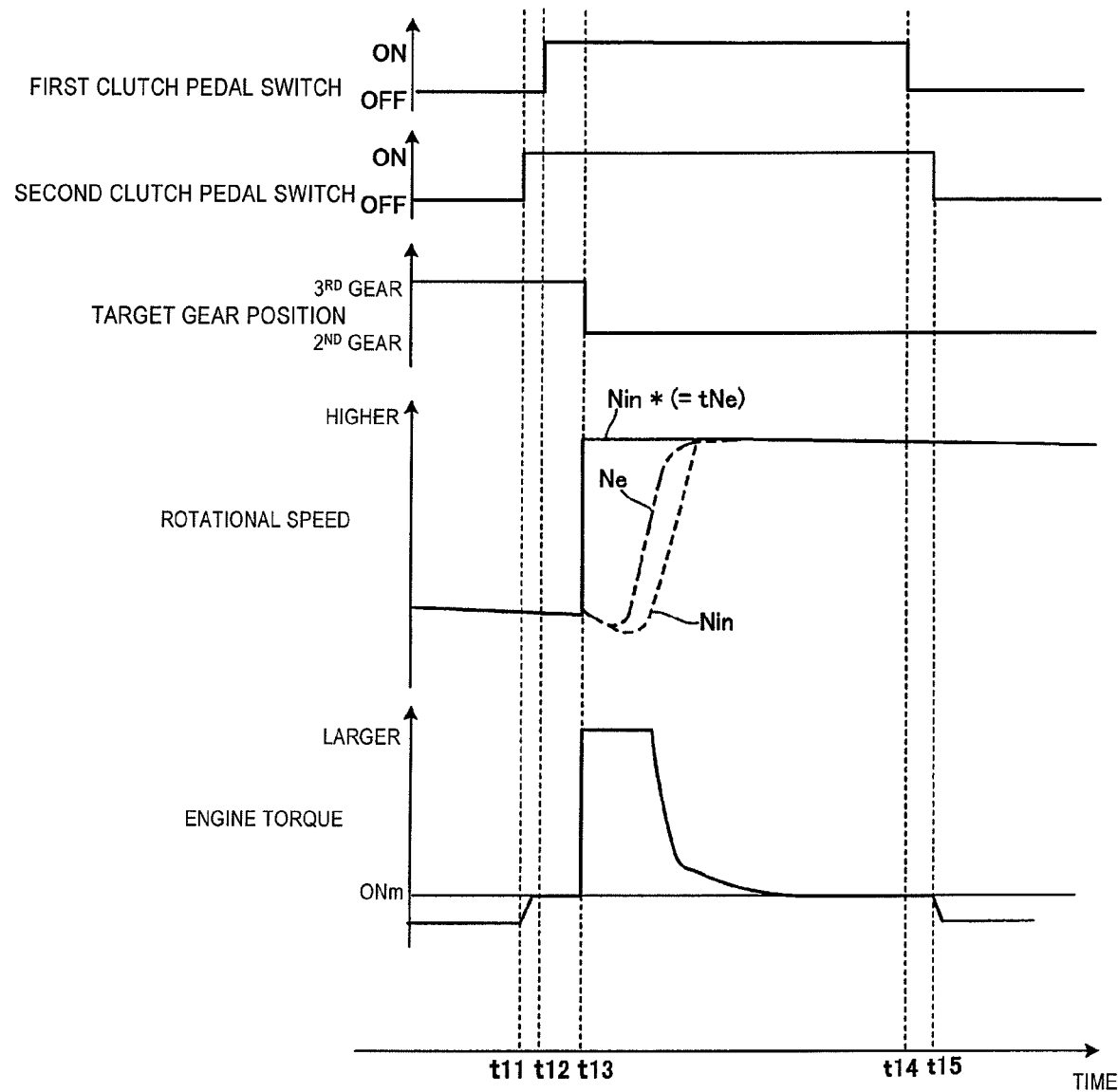
FIG. 5 is a time chart showing what occurs during a rotational speed synchronization control executed when a shift operation is performed while the depression amount of the clutch pedal large enough for the first clutch pedal switch to turn "on"
Figure 6:
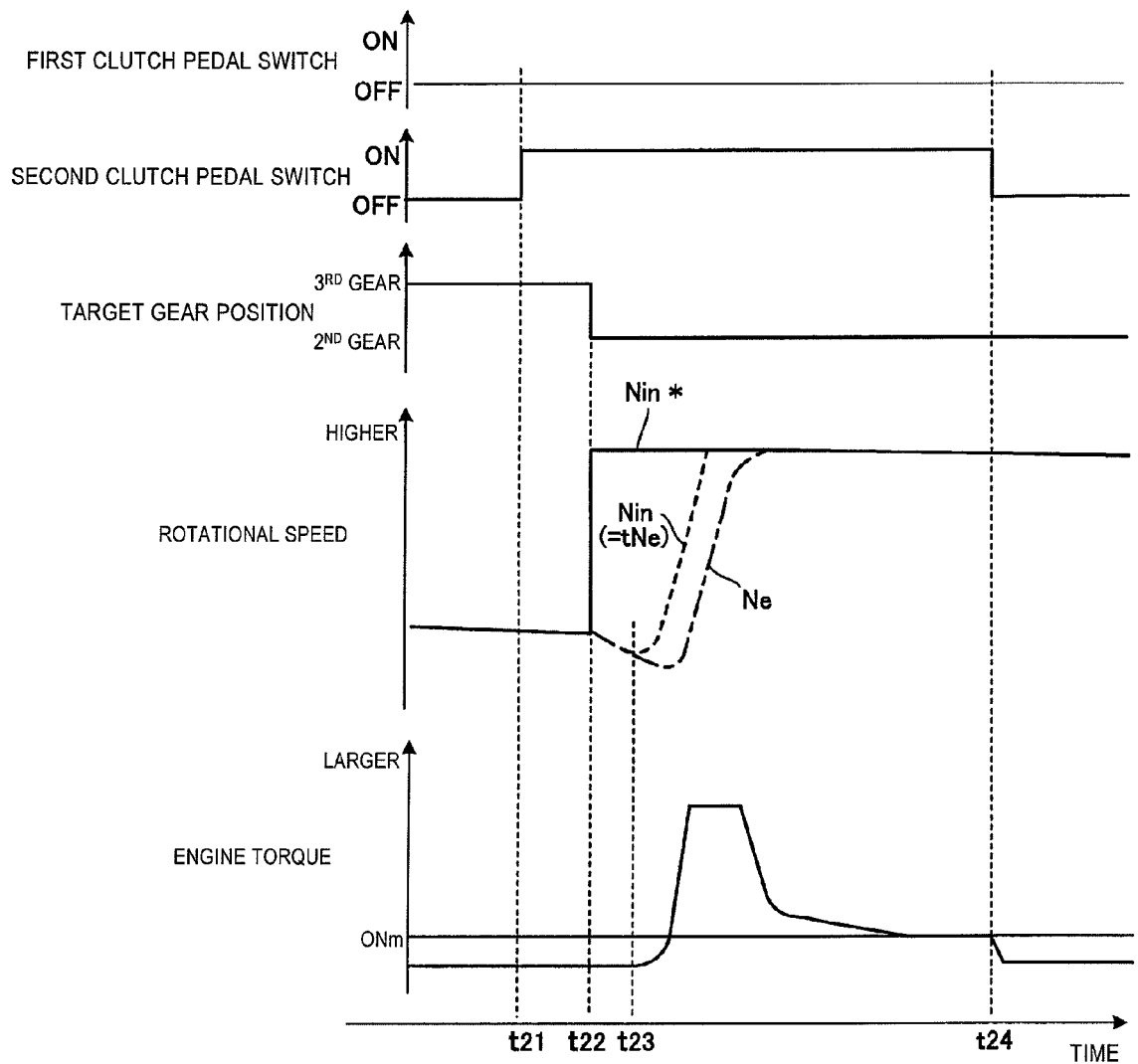
FIG. 6 is a time chart showing what occurs during a rotational speed synchronization control executed when a shift operation is performed while the depression amount of the clutch pedal not large enough for the first clutch pedal switch to turn "on".

FIGS. 5 and 6 are time charts illustrating what occurs during the rotational speed synchronization control.

FIG. 5 illustrates what occurs when a shift operation is performed while the depression amount D of the clutch pedal 17 is large (D>D1).

At a time t11, the second clutch pedal switch 22 turns "on" and the second rotational speed synchronization control is started. Meanwhile, the clutch pedal 17 is depressed further and at a time t12, the first clutch pedal switch 21 turns and the first rotational speed synchronization control is started instead of the second rotational speed synchronization control. However, since the shift lever 19 has not been operated and the target gear position has not changed, the rotational speed Ne of the engine 2 does not change at the time t12.

At a later time t13, the shift lever 19 is operated and the target gear position changes from third gear to second gear. As a result, the target rotational speed tNe increases and the engine torque increases such that the rotational speed Ne of the engine 2 is adjusted to the target rotational speed tNe. Since the first rotational speed synchronization control is started, the target rotational speed tNe is set to the post-shift transmission input rotational speed Nin*.

The first clutch pedal switch 21 turns "off" at a time t14 and the second clutch pedal switch 22 turns "off" at a time t15, thus ending the first and second rotational speed synchronization controls. Since the rotational speed Ne of the engine 2 is matched to the input rotational speed of the transmission 15 at the time t15, shift shock will not occur if the clutch 18 is connected.

FIG. 6 illustrates what occurs when a shift operation is performed while the depression amount D of the clutch pedal 17 is not large enough for the first clutch pedal switch 21 to turn "on" (D1>D>D2).

At a time t21, the second clutch pedal switch 22 turns "on" but the first clutch pedal switch 21 does not turn "on" because the depression amount D of the clutch pedal 17 is not sufficient. In such a situation, there is a possibility that the clutch 18 is released. If the clutch 18 is released, then it is possible to perform a shift operation. The second rotational speed synchronization control is started when the second clutch pedal switch 22 turns "on", but the rotational speed Ne of the engine 2 does not change because the target gear position has not changed.

Afterwards, at a time t22, the shift lever 19 is operated and the target gear position changes from third gear to second gear, but the rotational speed Ne of the engine 2 does not increase immediately. The reason is that the target rotational speed tNe of the engine 2 is set to the detection value Nin of the transmission input rotational speed, because the detection value Nin is the smaller than the post-shift transmission input rotational speed Nin*, and thus, the detection value Nin of the transmission input rotational speed does not increase until the gear position of the transmission 15 actually changes.

At a time t23, the gear position of the transmission 15 actually changes and the detection value Nin of the transmission input rotational speed increases. Therefore, the target rotational speed tNe also increases and the engine torque is increased such that the rotational speed Ne of the engine 2 becomes substantially equal to (matches) the target rotational speed tNe.

At a time t24, the second clutch pedal switch 22 turns "off" and the second rotational speed synchronization control ends. Since the rotational speed Ne of the engine 2 is matched to the input rotational speed of the transmission 15 at the time t24, shift shock will not occur if the clutch 18 is connected.

Additionally, it is acceptable for the method of setting the target rotational speed tNe to be such that when the shift operation is a downshift operation, as shown in the time chart of FIG. 6, the target rotational speed tNe can be set to whichever of the post-shift transmission input rotational speed Nin* and the detection value Nin of the transmission input rotational speed is closer to (less different than) the rotational speed Ne of the engine 2.

The operational effects of the illustrated embodiment will now be explained.

The engine controller 1 of the illustrated embodiment is configured and arranged to set the target rotational speed tNe to the post-shift transmission input rotational speed Nin* determined based on the vehicle speed and the post-shift gear position and control the engine 2 such that the rotational speed Ne of the engine 2 becomes substantially equal to (matches) the target rotational speed tNe (first rotational speed synchronization control) when the depression amount D of the clutch pedal 17 during shifting is detected to be larger than a first prescribed depression amount D1 by the first clutch pedal switch 21.

The engine controller 1 is further configured and arranged to set the target rotational speed tNe to the smaller of the post-shift transmission input rotational speed Nin* and the detection value Nin of the transmission input rotational speed and control the engine 2 such that the rotational speed Ne of the engine 2 becomes substantially equal to (matches) the target rotational speed tNe (second rotational speed synchronization control) when the depression amount D of the clutch pedal 17 during shifting is detected to be smaller than the first prescribed depression amount D1 by the first clutch pedal switch 21 but detected to be larger than a second prescribed depression amount D2 by the second clutch pedal switch 22.

With the illustrated embodiment, the even when the depression amount D of the clutch pedal 17 is not large during shifting, a second rotational speed synchronization control is executed in anticipation of the possibility that the driver might shift gears. As a result, a control for synchronizing the rotational speeds of the engine and the transmission can be started whenever possible and the shift shock that occurs when the clutch 18 connects can be reliably suppressed.

With this illustrated embodiment, the second clutch pedal switch 22 is configured to turn "on" at a clutch depression amount that is reached before the clutch 18 disconnect position is reached and the second rotational speed synchronization control is configured to set the target rotational speed tNe to the smaller of the post-shift transmission input rotational speed Nin* and the detection value Nin of the transmission input rotational speed when only the signal of the second clutch pedal switch 22 is "on" (first clutch pedal switch 21 is not on). Thus, when the rotational speed synchronization control of the engine rotational speed is started based on the signal of the second clutch pedal switch 22, acceleration or deceleration that is not intended by the driver does not occur even if the clutch 18 is still in a connected state.

Although the time chart of FIG. 6 illustrates a case in which the transmission is downshifted during deceleration of the vehicle, a similar effect is obtained when the transmission is upshifted during acceleration of the vehicle. During upshifting, the second rotational speed synchronization control functions to adjust the engine rotational speed from a higher rotational speed to a lower rotational speed. In such a case, the target rotational speed tNe of the engine is set to the smaller of the post-shift transmission input rotational speed Nin* and the detection value Nin of the transmission input rotational speed. Thus, when the rotational speed synchronization control of the engine rotational speed is started based on the signal of the second clutch pedal switch 22 (which turns "on" at a clutch depression amount that is reached before the clutch disconnect position is reached), even if the clutch 18 is actually still in a connected state, the target rotational speed tNe of the engine 2 is set to the smaller of the post-shift transmission input rotational speed Nin* and the detection value Nin of the transmission input rotational speed. As a result, since the engine rotational speed can be lowered quickly, the difference between the transmission input rotational speed and the engine rotational speed can be reduced by the time the clutch 18 is connected and shift shock can be suppressed in a reliable fashion.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine control apparatus for a vehicle equipped with a manual transmission, the engine control apparatus comprising:

a shift operation detecting component configured to detect a manual shift operation;

a vehicle speed detecting component configured to detect a vehicle speed;

a transmission input side rotational speed computing component configured to compute an input side transmission rotational speed that is determined based on a vehicle speed and a gear ratio based on a shift position detected by the shift operation detecting component;

a transmission input side rotational speed detecting component configured to detect an input rotational speed of the manual transmission;

a clutch depression amount detecting component configured to detect if a depression amount of a clutch pedal is larger than a first prescribed depression amount that is equal to or larger than a depression amount corresponding to a disconnect position of the clutch, and to detect if the depression amount of the clutch pedal is larger than a second prescribed depression amount that is smaller than the depression amount corresponding to the disconnect position of the clutch; and a rotational speed synchronization control component configured to control an engine rotational speed to a target rotational speed by using the input side transmission rotational speed computed by the transmission input side rotational speed computing component as the target rotational speed when the clutch depression amount detecting component has detected that the depression amount of the clutch pedal during shifting is equal to or larger than the first prescribed depression amount, and the rotational speed synchronization control component being further configured to control the engine rotational speed to the target rotational speed by using the smaller of the input side transmission rotational speed computed by the transmission input side rotational speed computing component and an input rotational speed detection value detected by the transmission input side rotational speed detecting component as the target rotational speed, when the clutch depression amount detecting component has detected that the depression amount of the clutch pedal during shifting is smaller than the first prescribed depression amount and larger than the second prescribed depression amount.

2. The engine control apparatus as recited in claim 1, wherein the clutch depression amount detecting component comprises a first clutch pedal switch and a second clutch pedal switch, with the first clutch pedal switch being configured and arranged to detect if the depression amount of the clutch pedal is larger than the first prescribed depression amount, and the second clutch pedal switch being configured and arranged to detect if the depression amount of the clutch pedal is larger than the second prescribed depression amount.

3. A rotational speed synchronization control method comprising:

computing an input side transmission rotational speed of a manual transmission based on a detected vehicle speed and a gear ratio based on a detected shift position;

detecting an input rotational speed of the manual transmission;

detecting if a depression amount of a clutch pedal is larger than a first prescribed depression amount that is equal to or larger than a depression amount corresponding to a disconnect position of the clutch;

detecting if the depression amount of the clutch pedal is larger than a second prescribed depression amount that is smaller than the depression amount corresponding to the disconnect position of the clutch; and controlling an engine rotational speed to a target rotational speed by using the input side transmission rotational speed as the target rotational speed that was computed when the depression amount of the clutch pedal during shifting is detected to be equal to or larger than the first prescribed depression amount, and using the smaller of the input side transmission rotational speed that was computed and the input rotational speed that was detected as the target rotational speed, when the depression amount of the clutch pedal during shifting that was detected to be smaller than the first prescribed depression amount and larger than the second prescribed depression amount.

4. The rotational speed synchronization control method as recited in claim 3, wherein the detecting of the depression amount of the clutch pedal being larger than the first prescribed depression amount is accomplished by using a first clutch pedal switch, and the detecting of the depression amount of the clutch pedal being larger than the second prescribed depression amount is accomplished by using a second clutch pedal switch.

* * * * *